United States Patent [19]

Halasa et al.

[11] 3,898,207
[45] Aug. 5, 1975

[54] PROCESS FOR POLYMERIZING CONJUGATED DIENES

[75] Inventors: Adel Farhan Halasa, Bath; Richard Gutierrez, Akron, both of Ohio

[73] Assignee: The Firestone Tire & Rubber Company, Akron, Ohio

[22] Filed: Mar. 25, 1974

[21] Appl. No.: 454,051

[52] U.S. Cl. .................................. 260/85.3 R
[51] Int. Cl.$^2$ .................. C08F 4/48; C08F 4/54; C08F 210/06
[58] Field of Search ............ 260/85.3 R, 94.9 E

[56] References Cited
UNITED STATES PATENTS

| | | | |
|---|---|---|---|
| 3,518,237 | 6/1970 | Duck et al. | 260/94.9 E |
| 3,736,312 | 5/1973 | Halasa | 260/85.3 R |
| 3,746,694 | 7/1973 | Cluff | 260/94.9 E |
| 3,803,107 | 4/1974 | Halasa | 260/85.3 R |

FOREIGN PATENTS OR APPLICATIONS 946,608   1/1964   United Kingdom........... 260/94.9 E Primary Examiner—Joseph L. Schofer
Assistant Examiner—A. Holler

[57] ABSTRACT

Conjugated dienes and alpha-olefins, such as butadiene and propylene, are copolymerized by a new catalyst system which gives copolymers containing a high proportion of the alpha-olefin with accompanying desired properties. This catalyst system comprises: (1) A titanium or vanadium halide, preferably chloride, and (2) the reaction product of an n-alkyl lithium and a dialkyl aluminum chloride, such as n-butyllithium and diethyl aluminum chloride. The copolymers produced by this process have molecular weights in the range of 50,000–200,000, preferably 100,000–200,000 and other desirable properties.

11 Claims, No Drawings

PROCESS FOR POLYMERIZING CONJUGATED DIENES

BACKGROUND OF THE INVENTION

1. Field of the Invention

This invention relates to a process for the copolymerization of a diene, such as butadiene, with an alpha-olefin, such as propylene using a catalyst comprising a titanium or vanadium halide, preferably the chloride, to give copolymers having a substantial proportion of propylene or other alpha-olefin therein.

2. Related Prior Art

The copolymerization of propylene with conjugated dienes has been reported in several instances. However, the methods reported for effecting such copolymerization have various disadvantages.

For example, British Pat. No. 1,108,630 shows the use of a catalyst system comprising $TiCl_4$, aluminumtrialkyl and iodine.

British Pat. No. 1,0236,615 discloses the use of $TiCl_4$ and an aluminum trialkyl complex prepared in the presence of propylene before the butadiene is added. The molecular weights and percentage yields are not given.

British Pat. No. 982,708 shows the use of vanadiumoxytrichloride and a dialkyl aluminum chloride to copolymerize butadiene and methylpentene-1.

U.S. Pat. No. 3,652,519 discloses the use of vanadiumoxytrichloride plus an aluminum trialkyl and iodine, bromine or chlorine to give butadiene-propylene random copolymers.

One disadvantage of transition metal catalysts such as titanium and vanadium compounds shown in the above systems is that with medium or strong acidity there is a considerable amount of alkylation effected which reduces the amount of polymerization. This generally results when oxygenated compounds are used in the catalyst system. It would be desirable therefore to have a catalyst system which the acidity is reduced to a very mild degree, or in other words that the reducing agent controls the acidity so that it has a very mild effect, and thereby avoid the disadvantages indicated above.

Moreover, in order to obtain satisfactory molecular weights the polymerizations in these prior art systems need to be effected at low temperatures, which are impractical for industrial purposes because of the added expense and slow polymerization rates.

SUMMARY OF THE INVENTION

In accordance with the present invention, it has now been found that copolymers of a conjugated diene with an alpha-olefin may be prepared with high proportions of the alpha-olefin therein to give desirable properties. The n-alkyllithium and the dialkyl aluminum chloride are prereacted, at a low temperature and in an inert solvent such as hexane or cyclohexane to give a salt complex which is soluble in the hydrocarbon solvent. The complex is believed to have the formula $[Et_2Al(Cl)Bu]^- Li^+$. The reaction of the alkyllithium and the dialkyl aluminum chloride is advantageously conducted at a low temperature, advantageously below 0°C. and preferably below −50°C. While some of the desired complex is formed with a lower proportion of n-alkyllithium, it is generally desirable to react at least one molar part of the n-alkyllithium per mole of dialkyl aluminum chloride and preferably about 2 moles or up to 4 moles of n-alkyllithium per mole of dialkyl aluminum chloride. With less than 1.5 moles of n-alkyllithium per mole of dialkyl aluminum chloride, the complex gives a milky dispersion in the hydrocarbon solvent. With about two moles of the n-alkyllithium, the complex is completely dissolved.

The n-alkyllithium advantageously has 2-6 carbon atoms in the alkyl group, such as n-butyl, n-amyl, n-propyl, etc.

In the dialkyl aluminum chloride, the alkyl groups each have 1–8 carbon atoms, such as methyl, ethyl, propyl, hexyl, octyl, etc.

The titanium and vanadium halide compounds may be represented by the formulas $TiBr_nCl_{4-n}$ and $VBr_mCl_{5-m}$ where n has a value from 0 to 4 and m has a value of 0 to 5. Preferably the titanium or vanadium is completely saturated with chloride. However, various degrees of substitution by bromine also gives suitable results.

The molar ratio of aluminum to Ti or V in the catalyst composition is advantageously in the range of 1.0 to 4.0 percent mole of Ti or V compound.

The catalyst is used in a proportion of 0.1 to 4 millimoles per 100 grams of monomer. In referring to millimoles of catalyst, this corresponds to the millimoles of the titanium or vanadium compound since the catalyst is regarded or at least calculated as a complex of the titanium or vanadium compound with the other catalyst components.

Polymerization is advantageously conducted at a temperature of 5°–50°C., preferably 20°–50°C. At these temperatures polymers are produced with yields as high as 98–99 percent molecular weights generally no higher than 500,000, preferably in the range of about 100,000 to 200,000. At these temperatures, the polymerization rate is quite fast and very practical use is made of this catalyst. This is in contrast to prior art processes which require temperature of −40° to 0°C. to obtain practical molecular weights.

The microstructure is generally about 70–90 percent trans-1,4, about 2–3 percent 1,2 and about 7–10 percent cis-1,4. The copolymers have a high degree of random distribution of comonomer repeating units although there may also be some block copolymer formed. Either form is suitable for tire compositions. The copolymers also have a low glass transition temperature −96° to −44°C., which is desirable for good tire properties.

The polymerization is advantageously effected in the presence of an inert diluent to facilitate handling of the polymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either.

Conjugated dienes that may be copolymerized in accordance with this invention include: 1,3-butadiene, isoprene, chloroprene, 2-phenyl-1,3-butadiene, piperylene, etc.

The alpha-olefins that may be copolymerized with the conjugated diene include ethylene, propylene, n-butene-1, isobutylene, n-pentene-1, and other alpha-olefins having up to 10 carbon atoms.

In the comonomer mixture, the propylene or other olefin is used in an amount representing 10–90 percent preferably 10–50 percent by weight of the total monomers. In the resultant copolymer, the proportion of olefin depends somewhat on the degree of conversion but in most cases is in the range of 5–90 percent, preferably 10–95 percent olefin.

The rubbery copolymer of 1,3-butadiene and olefin produced by the present invention has processing properties and practical physical properties superior to those of rubber products obtained from natural rubber. It can be used for articles such as tire carcases, tire treads, belting, industrial articles, sponge products and car accessories.

For the production of rubber products the copolymer may be mixed with other rubbery materials such as natural rubber, butadiene-styrene rubber, polybutadiene rubber, polyisoprene rubber, chloroprene rubber, butadiene-acrylonitrile rubber, butadiene-methacrylate rubber and and ethylene-propylene rubber in any desired proportion. It is effective for improving the processing properties and practical properties of such rubbery materials. Generally, such a rubber composition should contain at least 20 percent by weight of the copolymer of the present invention. Below 20 percent, there is little improvement in the processing properties and the physical properties of the cured rubber products.

The "dilute solution viscosity" referred to herein is defined as the inherent viscosity determined at 25°C. on a 0.4 percent solution of the polymer in toluene. It is calculated by dividing the natural logarithm of the relative viscosity by the percent concentration of the solution, i.e., it is the inherent viscosity measured at 0.4 percent concentration. The molecular weights reported herein are determined from these viscosities and are the number average molecular weights.

SPECIFIC EMBODIMENTS OF THE INVENTION

The invention is illustrated by the following examples which are intended merely for the purpose of illustration and are not to be regarded as limiting the scope of the invention or the manner in which it may be practiced. Unless specifically indicated otherwise, parts and percentages are given by weight.

EXAMPLE I

A complex or reaction product of n-BuLi and diethylaluminum chloride is prepared under a nitrogen atmosphere by mixing in a flask at a temperature of −78°C. a suspension of 200 millimoles of n-BuLi in 50 ml. of hexane and a solution of 100 millimoles of diethylaluminum chloride in 50 ml. of hexane. The resultant clear solution is allowed to stand for several hours before use and may be stored at −78°C. for subsequent use. This solution contains 100 millimoles of complex in 100 ml. of solution and is used in preparing the catalyst composition used in the following examples.

EXAMPLE II

To a pressure reactor equipped with temperature control means, an agitator and monomer feed inlet, there are are introduced under a nitrogen atmosphere 200 ml. of hexane, one millimole of the complex prepared in Example I and one millimole of $TiCl_4$. The temperature is maintained at 30°C. while a blend of 70 gms. butadiene, 30 gms. propylene and 200 gms. toluene is fed in over a period of 2 hours. Reaction at 30°C. is continued for another 2 hours. Then the catalyst is deactivated by the addition of 2 ml. of isopropanol. After the product solution is filtered to remove suspended material, the filtrate is dumped into 1000 ml. of methanol containing 1% antioxidant and the precipitated polymer separated and dried. A yield of 96 percent polymer is obtained and analysis shows a 25.5 percent content of propylene and a molecular weight of 105,000. When tested in a standard tire formulation, it shows excellent processability.

EXAMPLE III

The procedure of Example II is repeated twice using in one case only the $TiCl_4$ and n-BuLi, in the same amounts, and in the other case only the $TiCl_4$ and diethylaluminum chloride, in the same amounts. In the first case, the n-BuLi reduces the $TiCl_4$ to $TiCl_3$ and only the propylene is polymerized. In the second case a gelled product is obtained. This shows that the three component combination is more suitable and it appears that the diethylaluminum chloride and the n-BuLi have a modifying effect on each other.

EXAMPLE IV

The procedure of Example II is repeated using a monomer feed containing 60 percent butadiene and 40 percent propylene. Similar results are obtained, with the polymer product containing 34.6 percent propylene.

EXAMPLE V

The procedure of Example II is repeated a number of times with similar results using in place of the propylene equivalent amounts respectively of n-butene-1, n-pentene-1 and n-hexene-1.

EXAMPLE VI

The procedures of Examples II, IV and V are repeated with similar results using in place of butadiene equivalent amounts of isoprene.

EXAMPLE VII

The procedure of Example II is repeated twice with similar results using in place of n-BuLi an equivalent amount respectively of n-amyl Li and n-hexyl Li.

EXAMPLE VIII

The procedure of Example II is repeated twice with similar results using in place of diethylaluminum chloride an equivalent amount respectively of dipropylaluminum chloride and dibutylaluminum chloride.

EXAMPLE IX

The procedure of Example II is repeated three times with similar results using in place of the $TiCl_4$ an equivalent amount respectively of $TiCl_2Br_2$, $TiCl_3Br$ and $TiBr_4$.

EXAMPLE X

The procedure of Example II is repeated three times with similar results using in place of the $TiCl_4$ an equivalent amount respectively of $VCl_5$, $VCl_3Br_2$ and $VBr_5$.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process for the hydrocarbon solution polymerization of a monomer composition consisting essentially of 10–90 percent by weight of a conjugated diene and 10–90 percent by weight of an alpha-olefin having 2–8 carbon atoms to produce a copolymer having 5–90 percent of the alpha-olefin in the resultant copolymer comprising the steps of maintaining said monomer composition at a temperature of 5°–50°C. in intimate contact with a catalyst composition consisting essentially of:
   a. The reaction product of an n-alkyllithium having 2–6 carbon atoms in said alkyl group and a dialkyl aluminum chloride having 1–8 carbon atoms in each said alkyl group; and
   b. A metal halide compound having the formula $TiBr_nCl_{4-n}$ or $VBr_mCl_{5-m}$ wherein n has a value of 0– and m has a value of 0–5, the concentration of said catalyst composition being 0.1–4 millimoles of catalyst per 100 grams of said monomer composition, said n-alkyllithium being reacted in a proportion of 1–4 moles per mole of said dialkylaluminum chloride, and the dialkylaluminum chloride product being used in a proportion of 1–4 moles per mole of said metal halide compound, said polymerization being conducted for a period of at least one hour.

2. The process of claim 1 in which said diene is butadiene.

3. The process of claim 2 in which said alpha-olefin is propylene.

4. The process of claim 3 in which the ratio of said n-alkyllithium is about 2 moles per mole of said dialkylaluminum chloride.

5. The process of claim 4 in which said n-alkyllithium is n-butyl lithium.

6. The process of claim 5 in which said dialkylaluminum chloride is diethylaluminum chloride.

7. The process of claim 6 in which said metal halide is titanium tetrachloride.

8. The process of claim 7 in which said temperature is 30°–50°C.

9. The process of claim 8 in which said monomer composition is 10–50 percent by weight propylene.

10. The process of claim 1 in which said n-alkyllithium is used in a proportion of about 2 moles per mole of said dialkylaluminum chloride.

11. The polymerization product produced by the process of claim 1.

* * * * *

UNITED STATES PATENT OFFICE
CERTIFICATE OF CORRECTION

Patent No. 3,898,207            Dated  August 5, 1975

Inventor(s)  Adel Farhan Halasa and Richard Gutierrez

It is certified that error appears in the above-identified patent and that said Letters Patent are hereby corrected as shown below:

In Column 1, Line 21, "British Pat. No. 1,0236,615" should read --British Pat. No. 1,026,615--.

In Column 1, Line 59, " $Et_2Al(Cl-$" should read --$[Et_2Al(Cl)$--

In Column 1, Line 60, ")$Bu]^-Li^+$" should read --$Bu]^-Li^+$--.

In Column 5, Line 26, after "0-" insert --4--.

Signed and Sealed this thirtieth Day of September 1975

[SEAL]

Attest:

RUTH C. MASON
Attesting Officer

C. MARSHALL DANN
Commissioner of Patents and Trademarks